US010316890B2

(12) United States Patent
Daigle et al.

(10) Patent No.: US 10,316,890 B2
(45) Date of Patent: Jun. 11, 2019

(54) SPHERICAL BEARING INSERT ROTARY BEARING AND METHOD OF MANUFACTURE

(71) Applicants: Chad M. Daigle, Lafayette, LA (US); Mark Hunt, Tomball, TX (US)

(72) Inventors: Chad M. Daigle, Lafayette, LA (US); Mark Hunt, Tomball, TX (US)

( * ) Notice: Subject to any disclaimer, the term of this patent is extended or adjusted under 35 U.S.C. 154(b) by 0 days.

(21) Appl. No.: 14/849,731

(22) Filed: Sep. 10, 2015

(65) Prior Publication Data

US 2017/0074324 A1 Mar. 16, 2017

(51) Int. Cl.
*F16C 17/02* (2006.01)
*F16C 33/26* (2006.01)
*F16C 33/04* (2006.01)

(52) U.S. Cl.
CPC ............ *F16C 33/26* (2013.01); *F16C 33/043* (2013.01); *F16C 17/02* (2013.01); *F16C 2206/00* (2013.01); *F16C 2226/34* (2013.01); *F16C 2352/00* (2013.01)

(58) Field of Classification Search
CPC .......... F16C 17/02; F16C 29/02; F16C 31/02; F16C 33/043; F16C 33/24; F16C 33/26; F16C 33/1095
USPC ..... 384/26, 42, 91, 129, 276, 282, 297–300, 384/907.1
See application file for complete search history.

(56) References Cited

U.S. PATENT DOCUMENTS

| | | | |
|---|---|---|---|
| 3,940,836 A | 3/1976 | McCloskey | |
| 4,720,199 A | 1/1988 | Geczy et al. | |
| 5,137,074 A | 8/1992 | Gonzalez | |
| 5,209,577 A | 5/1993 | Swatek | |
| 5,857,782 A | 1/1999 | Waskiewicz | |
| 8,157,450 B2 | 4/2012 | Hosmer et al. | |
| 8,398,310 B2 | 3/2013 | Ehlert et al. | |
| 8,770,845 B1 | 7/2014 | Hunt et al. | |
| 2010/0264134 A1 | 10/2010 | Peterson et al. | |
| 2013/0182982 A1* | 7/2013 | Dennis | F16C 33/043 384/456 |
| 2015/0300408 A1* | 10/2015 | Thumm | F16C 33/043 508/103 |

FOREIGN PATENT DOCUMENTS

DE 3012487 * 10/1981

* cited by examiner

*Primary Examiner* — James Pilkington

(57) ABSTRACT

A radial bearing assembly and method of manufacture that provides a radial bearing assembly having a plurality of spherical bearing inserts, such as ball-shaped carbide inserts, bonded to a bearing sleeve. The bearing sleeve may include insert retainer channels, including insert retainer channels that extend diagonally or in a helical or spiral path along the length of the bearing sleeve. The method of manufacture utilizes a mold for simultaneously brazing and bonding the spherical bearing inserts to the surface of the bearing sleeve.

12 Claims, 8 Drawing Sheets

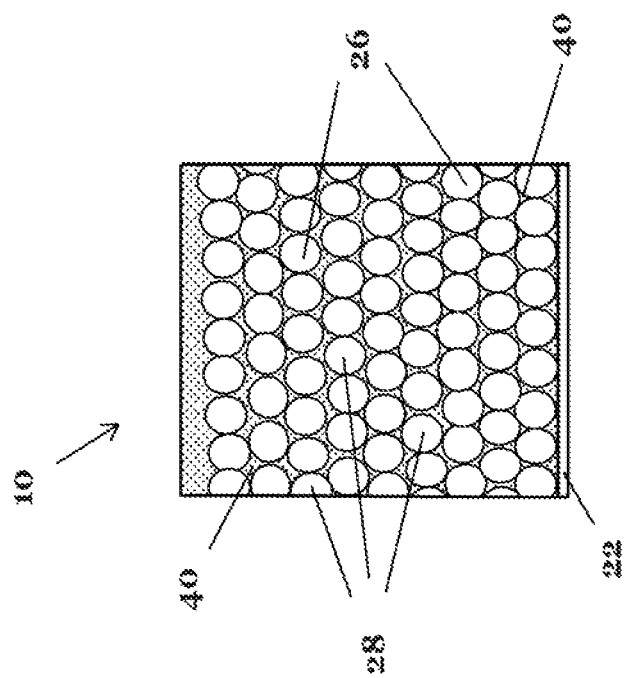
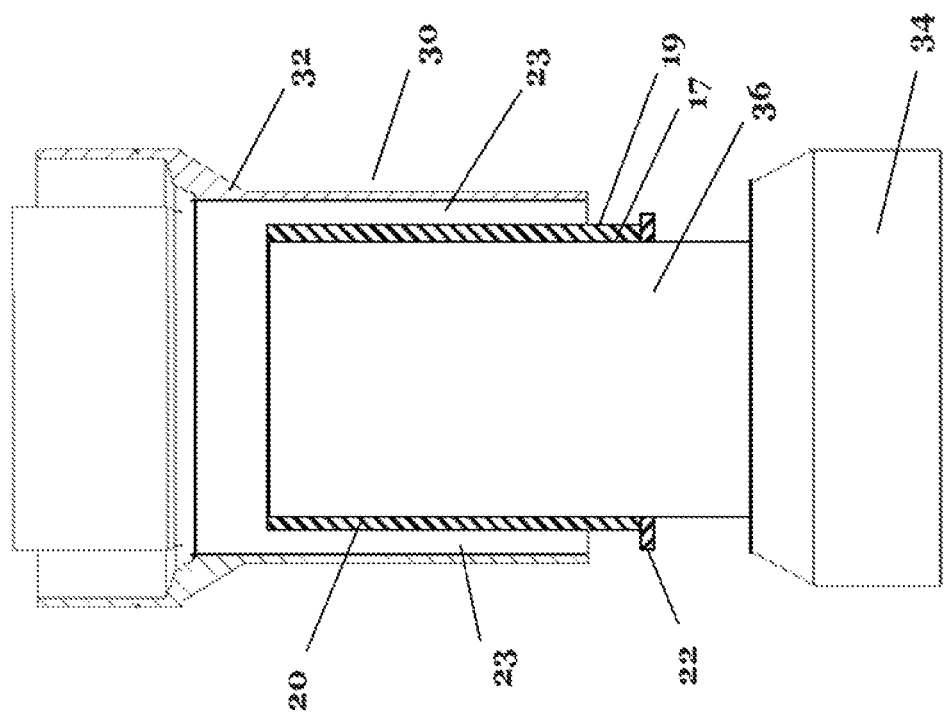

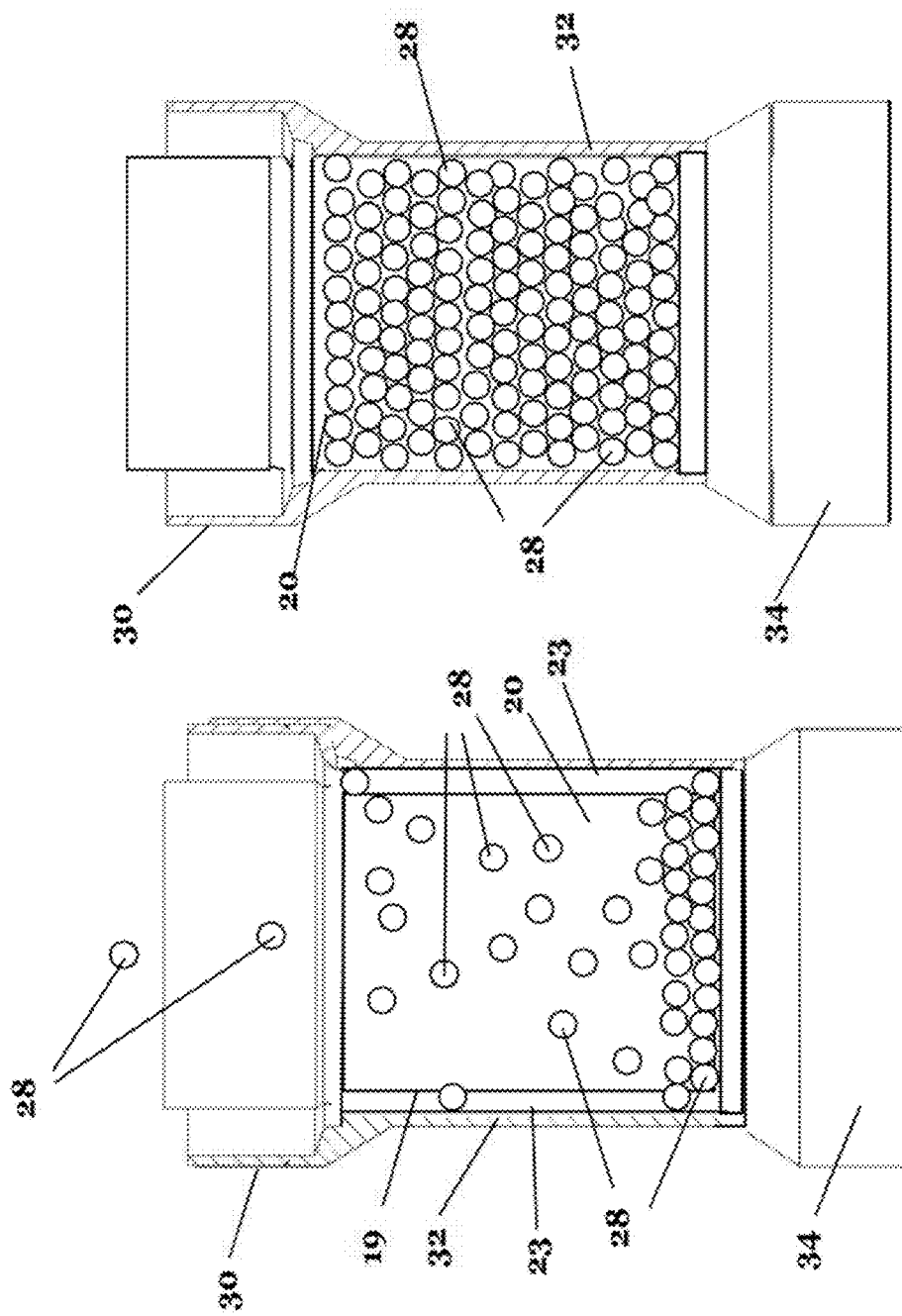

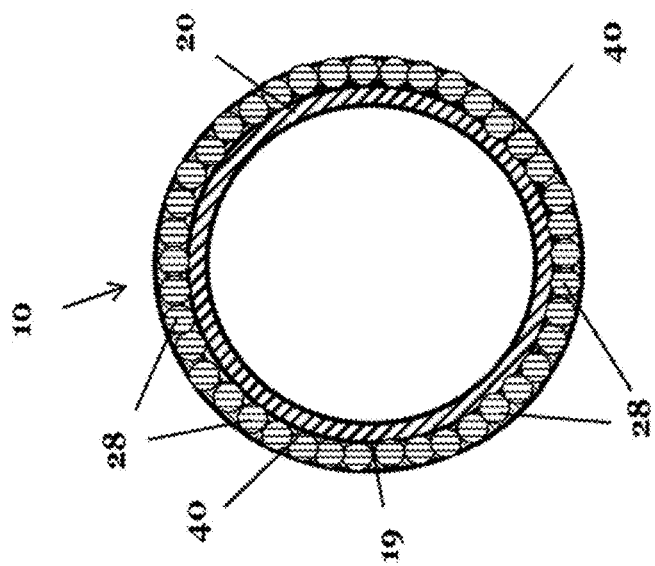
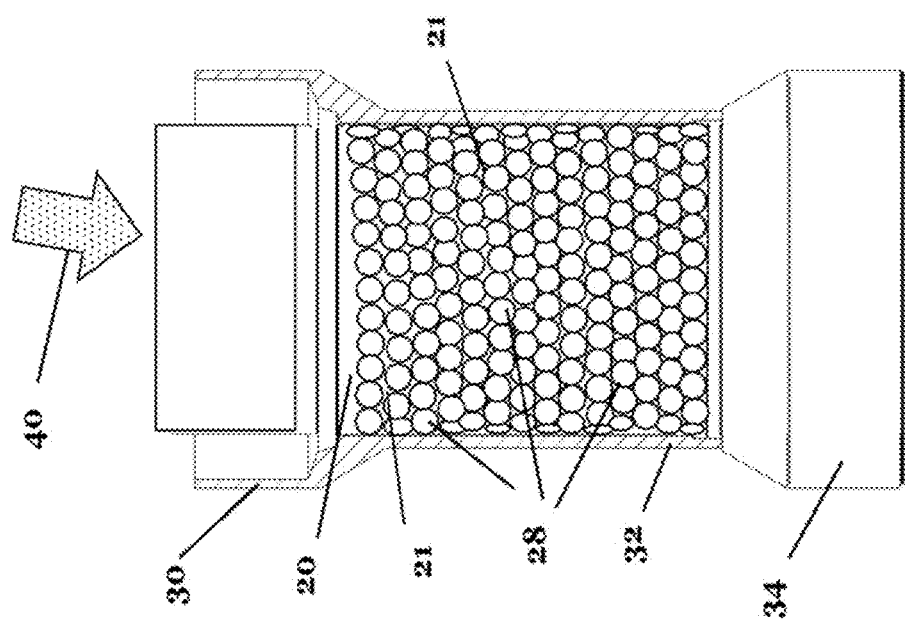

SPHERICAL BEARING INSERT ROTARY BEARING AND METHOD OF MANUFACTURE

FIELD OF THE INVENTION

This invention pertains to radial bearings for rotating machines and equipment. More particularly, it pertains to rotary bearing for mud motors and other dos equipment used in oil and gas wells.

BACKGROUND OF THE INVENTION

Radial bearing assemblies are utilized in many machine and tool applications to reduce rotational friction and to radially support loads. Such radial assemblies are often employed in downhole drilling motors used when drilling boreholes in the earth for oil and gas exploration. Some radial bearing assemblies employ a pair of opposing support members each having an opposing groove or bearing race. Bearing balls are positioned in the opposing races between the support members and as one support member rotates with respect to the other, the balls rotate in the races to reduce rolling resistance and friction between the opposing support members. Other radial bearing assemblies employ elongated rollers in place of the bearing balls.

Other radial hearing assemblies use bearing, inserts comprised of flat hard discs or plates to line the surface of opposing members. The hard smooth surface of the inserts reduce resistance and friction between the opposing support members as these support members rotate with respect to each other. Such bearing inserts are typically made of a hard carbide such as tungsten carbide, titanium carbide, silicon carbide, diamond silicon carbide composites, polycrystalline cubic boron nitride, or polycrystalline diamond, provide high strength, wear resistance and low friction between rotating support members.

When radial bearing assemblies are constructed with such baring inserts, each individual insert is placed in a bearing hole or aperture on the surface of the support members and attached by brazing or spot welding the insert in place on the support member or to a corresponding bearing ring positioned adjacent to the support member. A hearing hole or aperture is required to for attaching the disc to the bearing surface because of the difficulties encountered when welding or brazing a flat disc to a round bearing surface. Further, the machining of individual holes or apertures for the inserts and then spot welding or brazing each individual insert in place in its aperture is time consuming and expensive.

The geometry of a wellbore often places restrictions on the dimensions of downhole tools and equipment that may be used. The corresponding dimensional restrictions on radial bearings used in such downhole drilling tools and equipment impose quality control and machining difficulties that increase the cost of manufacturing these radial bearings. Applicants' U.S. Pat. No. 8,770,845 B1 disclosed a radial bearing assembly for downhole drilling equipment fabricated by inserting multiple flat disc shaped inserts into flat-bottomed retainer slots machined onto a tubular support and simultaneously brazing, these disc inserts within the slots in order to reduce the cost of bearing manufacture. While such bearings are now more efficiently manufactured, the cost of machining the flat-bottomed retainer slots is still time consuming and costly and often requires specialized machining equipment.

The rotary bearing assemblies used in downhole drilling motors typically utilize relatively thin and flat disc inserts. Thin and flat insert discs are susceptible to bending under the stresses induced during use of the drilling motors. Residual stresses induced during the manufacturing process including stress typically contained between the hard thin inserts and the steel body of the bearing assemblies can contribute to premature cracking of the disc inserts. Even excluding such manufacturer stress, the bearing surfaces of the disc inserts will wear down over time under the stresses of continual use. Such wear increases the likelihood of bending stress that can cause cracking on the bearing surfaces of the disc insert. Such cracking is a major problem as it will increase friction at the bearing surfaces that quickly lead to premature wear and eventual failure of the bearing assembly.

Further, disc inserts have sidewalls that extend perpendicular to its bearing surface. Brazing material around the sidewalls provides a mechanical grip on the disc inserts to permanently bond them in place. As the disc inserts wear during use, the sidewalls of the disc inserts become thinner and their gripping surface area at the brazing material is reduced. As these disc inserts wear under the stresses of use, risk of such disc inserts being dislodged from the brazing material and the bearing assembly is increased. The loss of one or more disc inserts from a radial bearing assembly will greatly increase the wear on the bearing surfaces of the remaining disc inserts and reduce the life of the bearing assembly. A lost disc insert may also migrate with the circulating wellbore fluid to another part of the downhole tool in which the bearing is employed, or to another wellbore tool, increasing the risk of tool malfunctions and resulting damage to the wellbore.

There is also an inherent limit on the number of discs that may be packed together in slots or grooves in a bearing assembly. It is advantage to tightly pack the bearing inserts into the slots or grooves in order to increase the bearing surface area provided by the discs. There is a need for a method of manufacturing radial bearing assemblies that will maximize the bearing surface area provided by the bearing inserts.

Consequently a need exists for a method that will reduce the cost of manufacturing radial bearing assemblies. There is also a need for a radial bearing assembly that will enhance the retention of the bearing inserts used in the bearing assembly under the stress encountered during use. There is a further need for a bearing assembly that will allow the bearing surface area of the bearing inserts to be maintained or enhanced as the bearing assembly is being used.

SUMMARY OF THE INVENTION

The present invention provides a radial bearing assembly having a plurality of bearing inserts that may be fabricated at a reduced cost, that will enhance the retention of the bearing inserts under the stresses imposed during use, and that will maintain or increase the surface area of the beating inserts as these inserts wear during use. The radial bearing assembly and methods of the present invention eliminates the use of thin disc inserts, the need for machining multiple individual insert channels, grooves, slots, holes or apertures to retain and support disc inserts, and the need for spot welding or brazing individual inserts in place in a corresponding channel, slot, hole or aperture.

The radial bearing assembly of the present invention is comprised of a tubular bearing sleeve that supports a plurality of hard spherical bearing inserts, preferably hard round ball-shaped bearing inserts, such as spherical bearing inserts comprised of hard tungsten carbide, that are held in place on the bearing sleeve substrate by a layer of brazing material.

The radial bearing assembly is manufactured by placing the tubular bearing sleeve around an inner support member of an inner brazing mold section and placing an outer brazing mold section around the tubular bearing sleeve to leave a uniform annular gap or space between the bearing sleeve and the outer brazing mold section. The plurality of spherical bearing inserts is then inserted into the annular space between the bearing sleeve and the outer brazing mold section where they are held in place. Brazing material, such as one comprising tungsten carbide powder combined with copper, nickel, or other alloys, is then introduced into the annular space between the bearing sleeve and the outer brazing mold section around the spherical bearing inserts. The brazing material is heated to melt and flow to fill the spaces between the spherical bearing inserts. The brazing material then with the spherical bearing inserts is permanently bonded in place around the tubular bearing sleeve. The bearing sleeve with the attached plurality of spherical bearing inserts is then removed from the brazing mold and machined to remove extraneous brazing material, smooth the radial surface of the bearing, and to provide a desired bearing surface area on the spherical bearing inserts.

The method may be adapted to manufacture a tubular radial bearing assembly having an interior inner peripheral radial bearing surface. In manufacturing such a bearing assembly, a tubular bearing sleeve is placed around a bearing support sleeve of a brazing mold to create an annular space between the inner surface of the bearing sleeve and the mold support sleeve and a plurality of spherical bearing inserts is placed in the annular space. Brazing material is inserted in the annular space around the spherical bearing inserts and heated to flow around the bearing inserts. The brazing material is cooled leaving the spherical bearing inserts bonded to the bearing sleeve. The brazing mold and extraneous brazing material is removed from the bearing sleeve by machining or other means to leave the spherical bearing inserts securely bonded to the bearing sleeve and with a desired bearing surface area. A similar method may also be adapted for manufacturing thrust bearings.

Spherical bearing inserts have a number of advantages. The spherical shape of such inserts is inherently robust and adds strength and wear resistance to the finished surface of the radial bearing assembly. Spherical bearing inserts are partially encased by brazing material above their mid-line which will enhance the mechanical grip of the brazing material when compared to a flat a disc insert. Unlike a flat disc inserts, which provide a uniform insert bearing surface area throughout the useful life of a bearing assembly from the outset, spherical bearing inserts provide an insert hearing surface that increases as the insert wears over its useful life.

During manufacturing of a bearing assembly spherical bearing inserts will easily roll in place around the bearing sleeve in the annular space between the bearing sleeve and the mold. This will reduce the time required for loading and arranging inserts in place in a slot or channel. Spherical bearing inserts will self-arrange against the bearing sleeve substrate requiring no special machining outside of typical lathe operations. This will reduce the manufacturing cost of the radial beating when compared to manufacturing bearings having machined pockets, slots, or grooves for retaining bearings. Should a particular bearing design require a retaining groove or slot to support the spherical bearing inserts, a round bottom groove or slot sufficient to accommodate a sphere is more simply machined than a precise, flat bottomed retainer slot, pocket or groove that may be required for a disc insert.

BRIEF DESCRIPTION OF DRAWINGS

FIG. 1 is a side view of the bearing sleeve of the radial beating assembly of Applicants' invention.

FIG. 2 is a partial cut-a-way exploded side view of the bearing sleeve of the radial bearing assembly shown in FIG. 1 positioned in a brazing mold.

FIG. 3 is a partial cut-a-way cross-section side view of the bearing sleeve and the brazing mold showing placement of the spherical bearing inserts during manufacture of the radial bearing assembly shown in FIG. 1.

FIG. 4 is a partial cross-section side view of the mold and bearing sleeve after placement of the spherical bearing inserts during manufacture of the radial bearing assembly shown in FIG. 1.

FIG. 5 is a partial cross-section view of the brazing mold and bearing sleeve showing placement of brazing material around the spherical bearing inserts during manufacture of the radial bearing assembly shown in FIG. 1.

FIG. 6 is a cross-sectional view of the radial bearing assembly of FIG. 1 after brazing of the spherical bearing inserts to the bearing sleeve.

DESCRIPTION OF THE EMBODIMENTS

Figure 7:
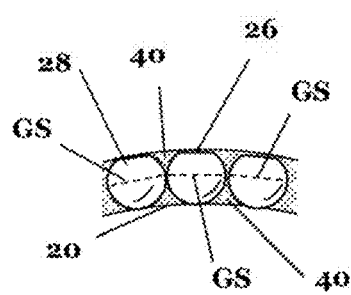
FIG. 7 is a schematic partial side cross-section view at the bearing inserts of the radial bearing assembly shown in FIG. 1 illustrating the initial insert bearing surfaces and the brazing material area around the surface of the spherical bearing inserts.

FIG. 1 shows the radial bearing assembly (10) of Applicants' invention. The radial bearing assembly (10) is comprised of a plurality of individual spherical bearing inserts (28) permanently bonded around the radial peripheral surface of a hollow elongated cylindrical tubular bearing sleeve (20). As best seen in FIG. 2, the tubular cylindrical bearing sleeve (20) has a radially outward extending bearing support rim (22). Brazing material (40) bonds the bearing inserts (28) to the bearing sleeve (20). The radial peripheral surfaces of the bearing assembly (10) are machined to remove excess brazing material (40) and to provide a bearing surface (26) of a desired surface area on each spherical bearing insert (28).

Figure 20:
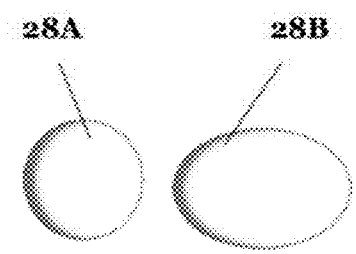
FIG. 20 is a schematic view of round ball-shaped spherical bearing inserts and ovate-shaped spherical bearing inserts.

The spherical bearing inserts (28) include round ball-shaped bearing inserts (28A) and bearing inserts that are rounded in shape such as egg or ovate-shaped bearing inserts (28B) as shown in FIG. 20 or combinations of such spherical bearing inserts. Such spherical inserts (28) have curved or arched surfaces that provide a robust bearing surface adding strength to the radial bearing assembly (10). Spherical bearing inserts (28) are preferably constructed of hard, high strength, wear resistant, low friction materials such as hard carbide including materials comprising tungsten carbide, titanium carbide, silicon carbide, diamond silicon carbide composites or polycrystalline cubic boron nitride and polycrystalline diamond material would be suitable for use.

FIG. 2 illustrates the bearing sleeve (20) positioned within a brazing mold (30). The cylindrical tubular bearing sleeve (20) has an interior inner peripheral radial surface (17) and an exterior outer peripheral radial surface (19). The brazing mold (30) is comprised of a tubular outer section (32) and an inner base section (34). The inner base section (34) has a centrally oriented cylindrical bearing sleeve support member (36) that projects outward from the base (34). The bearing sleeve support member (36) projecting from the mold base (34) is slidably positioned within the inner peripheral surface (17) of the bearing sleeve (20) to serve as a mounting surface for the bearing sleeve (20) during manufacture of the radial bearing assembly (10).

Along with FIG. 2, FIGS. 3, 4, 5, and 6 illustrate steps in the method of manufacturing the radial beating assembly (10). A desired radial bearing sleeve (20) and corresponding brazing mold (30) is selected for manufacture of a radial bearing, assembly. The selected hearing sleeve (20) is then positioned around the bearing sleeve support (36) of the mold base (34) as shown in FIG. 2. When the bearing sleeve (20) is in position on bearing sleeve support (36) against mold base (34), the tubular outer section (32) of the mold (30) is then placed upon the base (34) around the bearing sleeve (20). The outer section (32) of brazing mold (30) is configured to have an interior diameter sufficient to create an annular space (23) between the outer peripheral radial surface (19) of bearing sleeve (20) and the outer section (32) of the mold (30) as shown in FIG. 3.

With the outer section (32) of the mold (30) in place on the mold base (34) a plurality of spherical bearing inserts (2) are then placed around the outer peripheral surface of bearing sleeve (20) within the annular space (23) as shown in FIG. 3. When a desired number of spherical bearing inserts (28) are in place within the annular space (23) as shown in FIG. 4, the spherical bearing inserts (28) may then be bonded to the bearing sleeve (20). The spherical bearing inserts are bonded to the bearing sleeve (20) by placing a quantity of a selected hard solder or brazing material (32) in the annular space (23) to fill the spaces (21) between the spherical bearing inserts (28), the bearing sleeve (28), and the outer section (32) of brazing mold (30) as shown in FIG. 5. The brazing material (40) may be an suitable brazing material such as one comprising carbide powder combined with copper, nickel or other alloy and a flux, or the like.

The brazing material (40) is then heated to melt the brazing material to flow between and around the spherical bearing inserts and then cooled to simultaneously braze and permanently bond the spherical bearing inserts (28) in place upon the bearing sleeve (20). After brazing, the brazing mold (30) and the extraneous brazing material (40) are removed or machined away from the bearing sleeve (20) with the inserts (28) securely fastened by the brazing material (40) around the bearing sleeve (20) as shown in FIG. 6. The spherical bearing inserts (28) and brazing material (40) may be further machined as desired to create a bearing surface (26) of a desired surface area on each spherical bearing insert (28) of the bearing assembly (10) as shown in FIG. 1.

Figure 8:
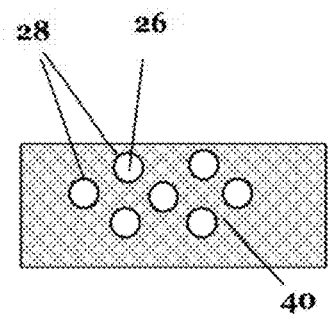
FIG. 8 is a schematic detail top view of the spherical bearing inserts and the insert bearing surfaces shown in FIG. 7.

FIGS. 7-12 shown schematic views of spherical bearing inserts (28) and brazing material (40) illustrating the effect of wear on the bearing inserts (28) during the life cycle of a bearing assembly (10). Schematic side and top views of a new bearing assembly (10) with spherical bearing inserts (28) are shown in FIGS. 7 and 8, respectively. These views show spherical bearing inserts (28) in a new bearing assembly (10) with initial first bearing surfaces (26) of a desired surface. In this initial stage, the peripheral surface area of each spherical bearing insert (28) is encased by the brazing material (40) above and below its great circle, also called its equatorial circle, i.e., the circle on surface of the spherical bearing insert (28) described by the intersection of the surface of the spherical bearing insert (28) and the horizontal plane intersecting the center of the spherical bearing insert (28). The brazing material (40) above and below the great circle maintains a mechanical grip on the spherical bearing insert.

Figure 9:
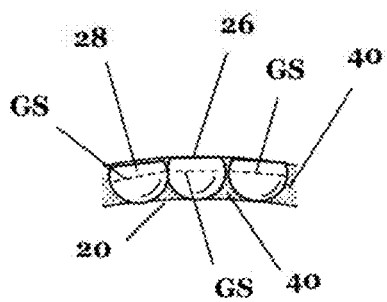
FIG. 9 is a schematic partial side cross-section view at the bearing inserts of the radial bearing assembly shown in FIG. 1 illustrating the effects of wear on the spherical bearing inserts and brazing material after use.
Figure 10:
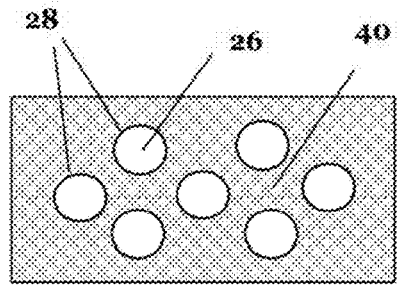
FIG. 10 is a schematic detail top view of the bearing inserts and bearing support surfaces shown in FIG. 9.

FIGS. 9 and 10 show, respectively, schematic side and top views of the bearing assembly (10) after the bearing inserts (28) and brazing material (40) begin to wear during use. In this case surface area of bearing surface (26) has an increased, even as the bearing insert (28) wears down during use. Brazing material (40) still encases each bearing insert (28) on the peripheral surface area of the insert (28) both above and below its great circle (GS) to maintain a mechanical grip on the spherical bearing inserts.

Figure 11:
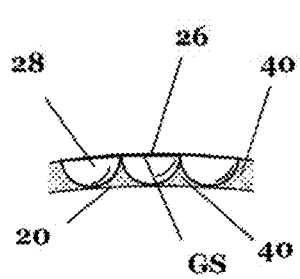
FIG. 11 is a schematic partial side cross-section view at the bearing inserts of the radial bearing assembly shown in FIG. 1 illustrating the effects of wear on the spherical bearing inserts and brazing material after further use.
Figure 12:
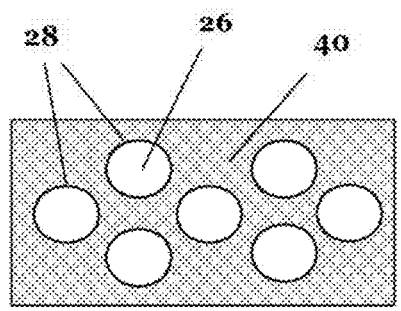
FIG. 12 is a schematic detail top view of the bearing inserts and bearing support surfaces shown in FIG. 11.

FIGS. 11 and 12 show, respectively, schematic side and top views of the bearing assembly (10) after the spherical hearing inserts (28) and brazing material (40) are worn away to the great circle (GS) of the spherical bearing inserts (28). At this stage of wear, the bearing surface area of bearing surface (26) of each bearing insert (28) has increased to its maximum. Each bearing insert (28) is still encased by brazing material (40) below its great circle (GS) to maintain the mechanical grip on the spherical bearing inserts.

Figure 13:
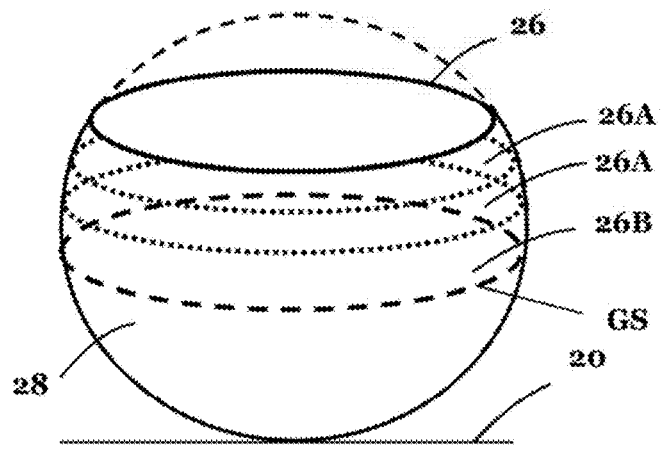
FIG. 13 is a schematic perspective view of a spherical bearing insert illustrating the sequential changes in the area of its bearing surface after wear.

FIG. 13 is a diagram illustrating the changes in geometry of a spherical bearing insert (28) incorporated into the radial bearing assembly (10). Each spherical bearing insert (28) in a new bearing assembly will have an initial circular bearing surface (26). As the insert (28) wears as the bearing assembly is used, a sequence of circular bearing surfaces (26A) with sequentially increasing bearing surface at will be produced until the great circle (GS) of the insert (28) is reached to create bearing surface (26B) which will have the maximum bearing surface area of the spherical bearing insert (28).

Figure 14:
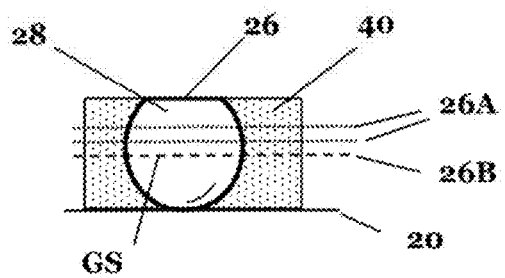
FIG. 14 is a schematic side view of a spherical bearing insert illustrating the sequential changes in its bearing surface and in its peripheral surface area and in the supporting brazing material caused by wear during use.
Figure 15:
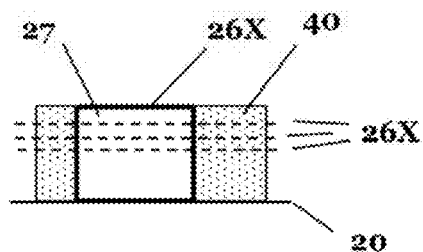
FIG. 15 is a schematic side view of a disc bearing insert having the same initial bearing surface area as the spherical bearing insert shown in FIG. 14 illustrating the sequential changes in the disc bearing surfaces and in the brazing material supporting its peripheral surface area caused by wear during use.
Figure 15A:
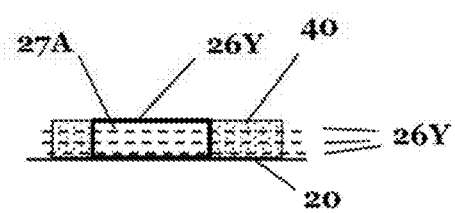
FIG. 15A is a schematic side view of a relatively thin disc bearing insert having the same initial bearing surface area as the spherical bearing insert shown in FIG. 14 illustrating the sequential changes in the thin disc bearing surfaces and in the brazing material supporting its peripheral surface area caused by wear during use.

FIGS. 14, 15, and 15A compare the difference in the bonding surface area of a spherical bearing insert (28) engaged with brazing material (40) to that of a corresponding disc insert (27). FIG. 14 shows a spherical bearing insert (28) having an initial bearing surface (26) bonded to a bearing sleeve (20) by brazing material (40). As the spherical bearing insert (28) wears during use bearing surfaces (26A) having sequentially increasing surface areas are produced until the bearing surface (26B) is created at the great or equatorial circle (GS) of the bearing insert (28). Brazing material (40) encases each spherical bearing insert (28) above and below its great circle (GS) even as the bearing wears.

FIG. 15 shows a cylindrical, disc bearing insert (27) that has a comparable diameter and thickness to that of the spherical bearing insert shown in FIG. 14. The bearing surface (26X) of bearing insert (27) remains the same as insert (27) wears. However, from the outset of the wear the peripheral surface area of cylindrical disc insert (27) engaged with the bonding material (40) is less than that of the spherical bearing insert (28) shown in FIG. 14. As cylindrical disc insert (27) wears during use, the surface area of the cylindrical disc insert (27) that is engaged with the bonding material (40) deceases more rapidly than the surface area of the spherical bearing insert (28) shown in FIG. 14. FIG. 15A illustrates a thin, cylindrical hard disc insert (27A) of the type that is typically used in radial bearings. Thin cylindrical disc insert (27A) has an initial bearing surface area (26Y) that is the same as the initial bearing surface area (26) of the spherical bearing insert (26) but the thickness of insert (27A) is substantially less than the diameter of spherical bearing insert (28) shown in FIG. 14. During use bonding surface (26Y) generally will have the same surface area throughout the life of the bearing assembly. However, the effect of wear on disc (27A) reduces the already limited peripheral bonding surface area around the disc (27A) making these hard and thin discs even more susceptible to dislodgement stresses induced by use. Because the peripheral surface area of spherical bearing insert (28) is greater at the outset than that of disc inserts (27) and (27A), and because the peripheral surface area of a spherical bearing insert (28) decreases at a lower rate than that of disc inserts (27) and (27A), the mechanical grip of the brazing material on a spherical bearing insert (28) is enhanced and maintained which will reduce the incidence of a beating insert (28) being lost or dislodged during use.

In a typical bearing assembly disc inserts are placed in slots or grooves cut into the side of the bearing sleeve and then bonded in the slot with brazing material. Because the slots or grooves utilize a significant portion of the radial surface area of the bearing sleeve, the combined bearing surface area of the disc inserts will usually be in the range of no more than about 56 to 60% of the total radial surface of the radial bearing. This bearing surface area ratio will decrease as the disc inserts wear and dislodge during use.

When a spherical bearing insert (28) is utilized as described for radial bearing assembly (10), the combined bearing surface areas (26) of the spherical bearing inserts (28) would provide a starting insert bearing surface in the range of about 42 to 47% of the total radial surface of the radial bearing. As the spherical bearing inserts (28) wear during use of the radial bearing, the surface area of bearing surface (26) each insert will increase as described, to increase the range of the combined bearing surfaces of the bearing inserts (28) to about 63% of the total radial surface of the radial bearing. When the spherical bearing inserts (28) wear to near the end of the useful life of the bearing assembly (10), the combined bearing surface areas of the spherical bearing inserts (28) would be in the range of 72 to 77% of the surface area of the radial bearing assembly. Rather than a stagnating or decreasing insert surface area during the useful life of a radial bearing, the spherical geometry of the spherical bearing inserts (28) provides a radial bearing assembly (10) having an increasing wear resistance throughout its useful life.

While the method described for producing a radial bearing assembly (10) eliminates the need, time, and expense of placing the spherical bearing inserts into slots, grooves, or channels in the hearing sleeve (20), FIGS. 16A and 16B and FIG. 17 and FIG. 18 illustrate the manufacture of an alternate radial bearing assembly that incorporates these channel features if circumstances would require such a bearing assembly. In such an embodiment, the alternate cylindrical tubular bearing sleeve (20A) shown FIG. 16A, having a plurality of spaced apart insert retainer channels (24A) on its outer peripheral radial surface (19) that extend along the axial length of bearing sleeve (20A), or the alternate cylindrical tubular bearing sleeve (20B), shown in FIG. 16B having a plurality of spaced apart inert midi r channels (24B) on its outer peripheral surface that extend diagonally or in a helical or spiral path along the axial length of bearing sleeve (20B), would be used in place of bearing sleeve (20) previously described. The channels (24A) and (24B) are used for retaining the spherical bearing inserts (28).

The benefits of a bearing having a bearing surface with an increasing bearing surface area with the enhanced peripheral bonding surface are still obtained from use of the spherical bearing inserts (28) in a radial bearing assembly with a sleeve (20A) or (20B), though the cost of manufacture would increase due to the machining required to create the channels (24A) and (24B). The cross-sectional edge or peripheral channel surfaces (24S) of channels (24A) and (24B) may be square, rectangular, curved, rounded, or any combination thereof. Preferably channels (24A) and (24B) will have a cross-sectional peripheral channel surface (24S) that is rounded or curved rather than a peripheral channel surface (24S) that has a flat bottom surface. Channels (24A) and (24B) with curved surfaces (24S) will be easier to machine and will allow for more liberal machining tolerances than channels with flat bottom surfaces which may ameliorate the extra machining costs.

Figure 16A:
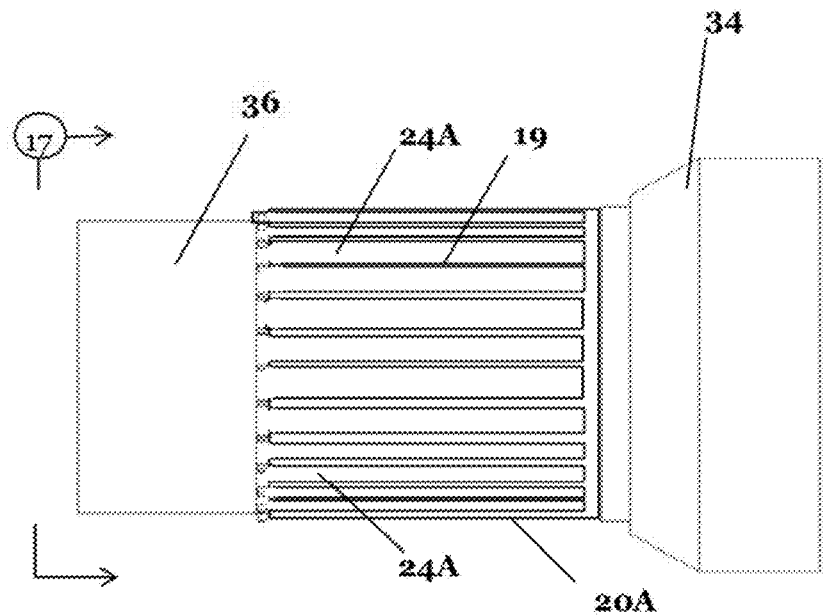
FIG. 16A is a side view of an alternate embodiment of a bearing sleeve and the inner brazing mold section and sleeve support for manufacture of a radial bearing assembly.
Figure 16B:
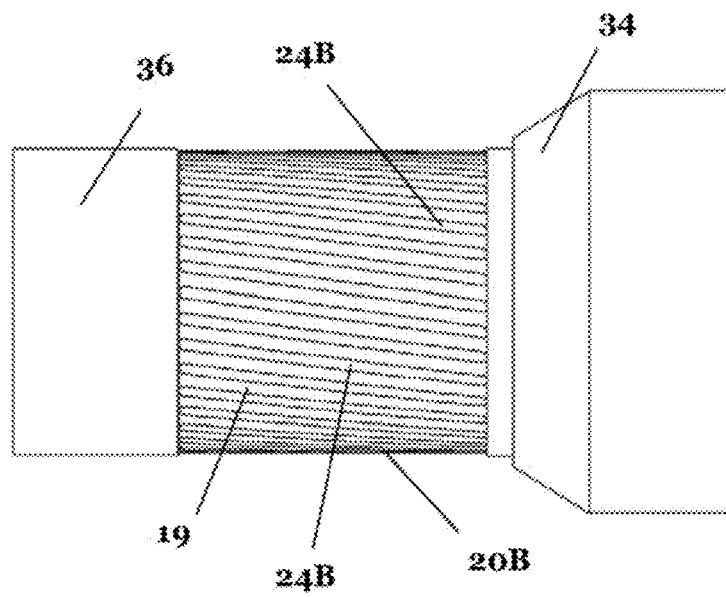
FIG. 16B is a side view of another alternate embodiment of a bearing sleeve and the inner brazing mold section and sleeve support for manufacture of a radial beating assembly.
Figure 17:
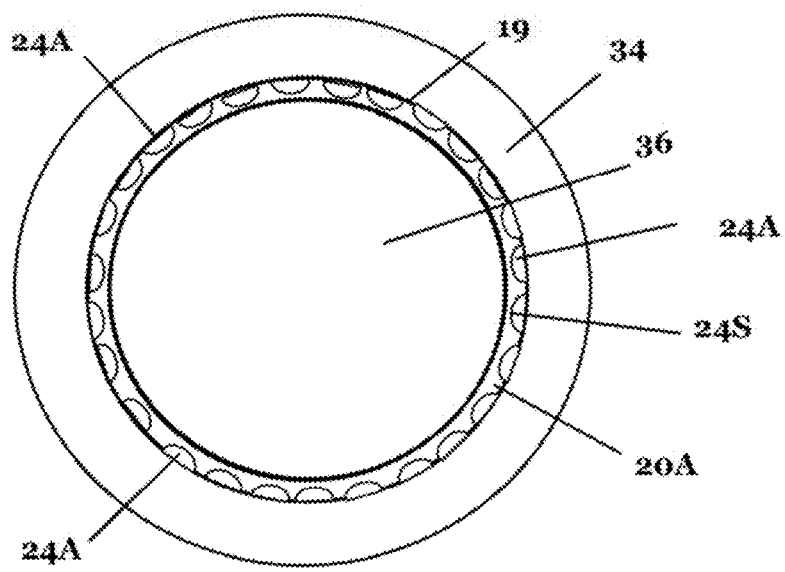
FIG. 17 is a schematic end view of the bearing sleeve and the inner brazing mold section and sleeve support shown in FIG. 16A.
Figure 18:
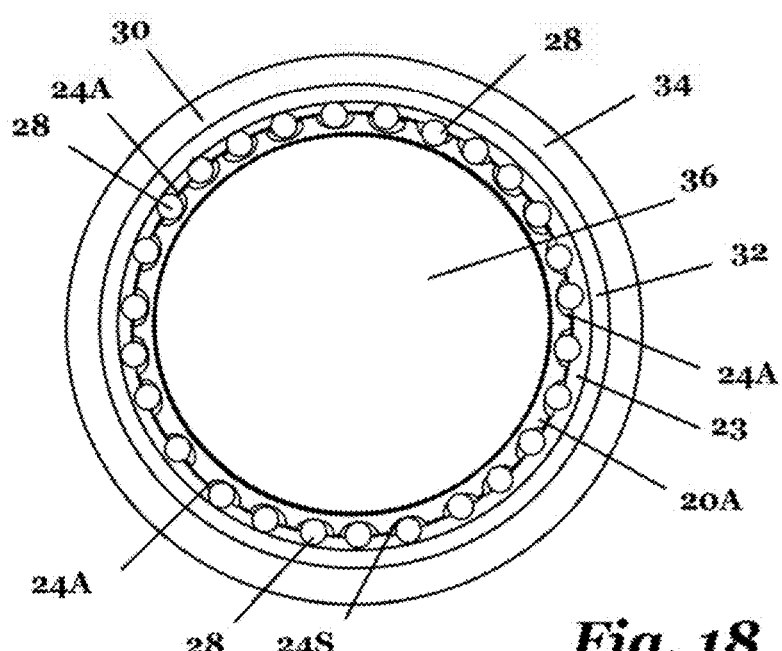
FIG. 18 is schematic end view of the alternate embodiment of the bearing sleeve of FIG. 16A with the inner and outer brazing mold sections and a plurality of spherical bearing inserts in place for subsequent brazing of the spherical bearing inserts to the bearing sleeve.

Manufacturing a radial bearing assembly having a bearing sleeve (20A) with channels (24A) or a bearing sleeve (20B) with channels (24B) that incorporates the spherical bearing inserts (28) is substantially the same as that illustrated in FIGS. 2-6 for radial bearing assembly (10). A bearing sleeve (20A) as shown in FIG. 16A, or alternatively a bearing sleeve (20B) as shown in FIG. 16B, is selected and substituted for bearing sleeve (20). The selected bearing sleeve, for example bearing sleeve (20A) as shown in FIGS. 17 and 18, is then positioned around the bearing sleeve support (36) of the mold base (34). With the selected bearing sleeve (20A) in position on bearing sleeve support (36), the tubular outer section (32) of the mold (30) is placed upon the base (34) around the selected bearing sleeve (20A) and the bearing sleeve support (36) to create annular space (23) between the outer section (32) of brazing mold (30) and the selected bearing sleeve (20A).

With the outer section (32) of the mold (30) in place on the mold base (34), a plurality of spherical bearing inserts (28) are placed in each channel (24A) of the selected bearing sleeve (20A) as shown in FIG. 18. When a desired number of spherical bearing inserts (28) is in place in each channel (24A), brazing material (40) is placed in the annular space (23) around the bearing sleeve (20) to fill the channels (24A) and annular space (23) in a manner similar to that shown in FIG. 5.

The brazing material (40) is then heated and subsequently cooled to simultaneously braze and bond the spherical bearing inserts (28) in place in the channels (24A) upon the bearing sleeve (20A) as previously described. The brazing mold (30) and the extraneous brazing material (40) are then removed or machined away from the bearing, sleeve (20A) with the inserts (28) securely in place in channels (24A). The brazing material (40) may be any suitable brazing material such as one comprising carbide powder combined with copper, nickel or other alloy and a flux, or the like.

Figure 19:
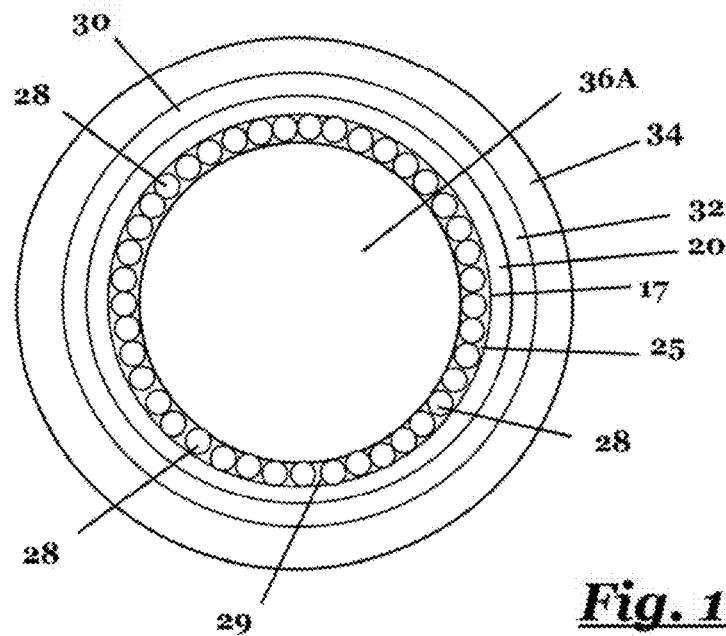
FIG. 19 is a schematic end view of a bearing sleeve, spherical bearing inserts, and brazing mold adapted for manufacturing a radial bearing assembly having interior radial bearing surfaces.

FIG. 19 is an end view of a brazing mold (30) and a bearing sleeve (20) configured for manufacture of a radial bearing assembly having a spherical bearing inserts (28) on the interior peripheral radial surface (17) of the bearing sleeve (20). In this configuration base (34) of mold (30) has a bearing sleeve support (36A) rather than sleeve support (36). Bearing sleeve support (36A) has a smaller diameter than sleeve support (36) which is used for placing inserts (28) on the outer radial surface of the sleeve (20). The smaller diameter of sleeve (36A) will provide an annular space (25) between the interior inner radial surface (17) of the bearing sleeve (20) and the sleeve (36A) sufficient to accommodate the spherical bearing inserts (28). The tubular outer section (32) of the mold (30) may also have a smaller diameter to support the outer radial surface of the bearing sleeve (20). The support sleeve (20) may be provided with a bearing support rim (22) similar to that shown in FIG. 1 that extends radially inward to abut bearing support (36A) if desired.

The steps for manufacture of a radial bearing assembly having spherical bearing inserts (28) on the interior inner radial surface (17) of the bearing sleeve (20) are similar to those described for radial bearing assembly (10) in FIGS. 2-6. Bearing sleeve (20) is placed around bearing sleeve support (35A) on the mold base (34) of mold (30). The tubular outer section (32) of the mold (30) may be placed upon the base (34) around the bearing sleeve (20A). A desired plurality of spherical bearing inserts (28) is placed in the annular space (25). Brazing material (40) is then placed in the annular space (25) around the spherical bearing inserts (28) in a manner similar to that shown in FIG. 5. The brazing material (40) is then heated to flow and fill the spaces (29) between bearing inserts (28) within the annular space (25) and cooled to simultaneously braze and bond the spherical bearing inserts (28) in place on the inner surface (17) of the bearing sleeve (20) with the brazing material (40).

The method may be adapted for creation of an inner radial bearing surface by placing spherical bearings inserts (28) in channels machined or cut into the interior inner peripheral radial surface (17) of bearing sleeve (20) in a manner similar to that shown in FIG. 18 and then completing the brazing steps described to bond the inserts in place. Similar methods of construction may also be readily adapted for thrust bearings. In one such method, a thrust bearing support member may be provided with one or more retainer grooves, channels, or spaces for retaining one or more spherical bearing inserts (28).

The radial bearing assembly (10) and the method of manufacture presented and their attendant advantages will be understood from the foregoing description and it will be apparent that various changes may be made in the form, construction and arrangement of the parts and steps thereof without departing from the spirit and scope of the inventions or sacrificing any material advantages, the form described being merely examples of embodiments of the inventions.

We claim:

1. A bearing assembly comprising;
   (a) an axially extending tubular bearing sleeve, said bearing sleeve having a radial bearing surface;
   (b) a plurality of insert retainer channels on said radial surface of said tubular bearing sleeve, said insert retainer channels extending along the axial length of said tubular bearing sleeve, and wherein said insert retainer channels include a curved bottom surface;
   (c) a plurality of abutting spherical bearing inserts positioned within each said insert retainer channel of said plurality of insert retainer channels; and
   (d) brazing material bonding said abutting spherical bearing inserts to said tubular bearing sleeve within said insert retainer channels.

2. The bearing assembly as recited in claim 1 wherein said brazing material is powdered brazing material that melts and flows when exposed to heat.

3. The bearing assembly recited in claim 2 wherein said bearing sleeve surface includes an outer peripheral radial surface of said bearing sleeve.

4. The bearing assembly recited in claim 2 wherein said bearing sleeve surface includes an interior peripheral radial surface of said bearing sleeve.

5. The bearing assembly as recited in claim 2 wherein said plurality of insert retainer channels includes insert retainer channels that extend diagonally along said axial length of said bearing sleeve.

6. The bearing assembly as recited in claim 1 wherein said plurality of insert retainer channels extend diagonally along the said axial length of said bearing sleeve.

7. A radial bearing assembly comprising:
   (a) an axially extending cylindrical tubular bearing sleeve having a radial bearing surface extending axially along said tubular bearing sleeve;
   (b) a plurality of insert retainer channels positioned radially around said radial bearing surface of said tubular bearing sleeve, said insert retainer channels extending along the axial length of said tubular bearing sleeve, and wherein said insert retainer channels include a curved bottom surface;
   (c) a plurality of abutting spherical bearing inserts positioned within said peripheral cross-sectional surface of said insert retainer channels; and
   (d) brazing material bonding said abutting spherical bearing inserts to said tubular bearing sleeve within said peripheral cross-sectional surface of said insert retainer channels.

8. The radial bearing assembly recited in claim 7 wherein said plurality of insert retainer channels includes insert retainer channels arranged to extend diagonally along said radial bearing surface of said tubular bearing sleeve.

9. The radial bearing assembly recited in claim 8 wherein said radial bearing surface is an outer peripheral radial surface.

10. The radial bearing assembly as recited in 7 wherein said bearing sleeve surface includes an outer peripheral radial surface of said bearing sleeve.

11. The radial bearing assembly as recited in 7 wherein said bearing sleeve surface includes an inner peripheral radial surface of said bearing sleeve.

12. The radial bearing assembly as recited in claim 7 wherein said plurality of spherical bearing inserts are selected from the group comprising round ball-shaped bearing inserts and ovate-shaped bearing inserts.

* * * * *